US011836892B2

(12) United States Patent
Junginger

(10) Patent No.: US 11,836,892 B2
(45) Date of Patent: Dec. 5, 2023

(54) DEVICE AND METHOD FOR TRAINING A MODEL, AND A VEHICLE

(71) Applicant: Robert Bosch GmbH, Stuttgart (DE)

(72) Inventor: Andrej Junginger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 378 days.

(21) Appl. No.: 16/992,638

(22) Filed: Aug. 13, 2020

(65) Prior Publication Data

US 2021/0073646 A1    Mar. 11, 2021

(30) Foreign Application Priority Data

Sep. 5, 2019   (DE) .......................... 102019213547.1

(51) Int. Cl.
*G06T 3/40* (2006.01)
*G06N 3/084* (2023.01)
(Continued)

(52) U.S. Cl.
CPC ........ *G06T 3/4053* (2013.01); *G06F 18/2163* (2023.01); *G06F 18/251* (2023.01);
(Continued)

(58) Field of Classification Search
CPC ............................. G06N 20/20; G06N 3/0454
See application file for complete search history.

(56) References Cited

U.S. PATENT DOCUMENTS

| | | | |
|---|---|---|---|
| 11,151,447 B1* | 10/2021 | Chen | G01S 7/4091 |
| 2017/0076224 A1* | 3/2017 | Munawar | G06N 3/045 |
| 2018/0174275 A1* | 6/2018 | Bourdev | G06V 30/19173 |

FOREIGN PATENT DOCUMENTS

| | | | |
|---|---|---|---|
| DE | 112015003762 T5 | 7/2017 | |
| DE | 102016225772 A1 | 6/2018 | |

(Continued)

OTHER PUBLICATIONS

Singla S, Gong M, Ravanbakhsh S, Sciurba F, Poczos B, Batmanghelich KN. Subject2Vec: generative-discriminative approach from a set of image patches to a vector. InInternational Conference on Medical Image Computing and Computer-Assisted Intervention Sep. 16, 2018 (pp. 502-510). Springer, Cham. (Year: 2018).*

(Continued)

*Primary Examiner* — Clifford Hilaire
(74) *Attorney, Agent, or Firm* — NORTON ROSE FULBRIGHT US LLP; Gerard Messina

(57) ABSTRACT

A device and a method for training a model including a first sub-model and a second sub-model. Digital data are downscaled to generate first input data. The digital data are divided into multiple data areas to generate second input data. A first sub-model generates first sub-model data relating to first input data fed to it. The first sub-model data are up-scaled to form first output data. A second sub-model for the data areas generates corresponding output data areas relating to second input data fed to it. The output data areas are assembled to form second output data. The first and second output data are combined to form third output data. The first sub-model is trained on the digital data by comparing provided target data and the first output data. The second sub-model is trained on the digital data by comparing the target data and the third output data.

6 Claims, 13 Drawing Sheets

(51) Int. Cl.
  *G06F 18/25* (2023.01)
  *G06F 18/21* (2023.01)
  *G06V 10/764* (2022.01)
  *G06V 10/82* (2022.01)
  *G06V 20/56* (2022.01)

(52) U.S. Cl.
  CPC ........... *G06N 3/084* (2013.01); *G06T 3/4046* (2013.01); *G06V 10/764* (2022.01); *G06V 10/82* (2022.01); *G06V 20/56* (2022.01)

(56) References Cited

FOREIGN PATENT DOCUMENTS

| DE | 102017201226 A1 | 7/2018 |
|----|-----------------|--------|
| DE | 102017116016 A1 | 1/2019 |

OTHER PUBLICATIONS

Lv F, Han M, Qiu T. Remote sensing image classification based on ensemble extreme learning machine with stacked autoencoder. IEEE Access. May 23, 2017;5:9021-31. (Year: 2017).*

Ren Y, Zhang L, Suganthan PN. Ensemble classification and regression-recent developments, applications and future directions. IEEE Computational intelligence magazine. Jan. 12, 2016;11(1):41-53. (Year: 2016).*

Zhu et al., "Unpaired Image-to-Image Translation Using Cycle-Consistent Adversarial Networks," Cornell University, 2018, pp. 1-18. ARXIV:1703.10593.

Liu et al., "Unsupervised Image-to-Image Translation Networks," Cornell University, 2018, pp. 1-11. ARXIV:1703.00848.

* cited by examiner

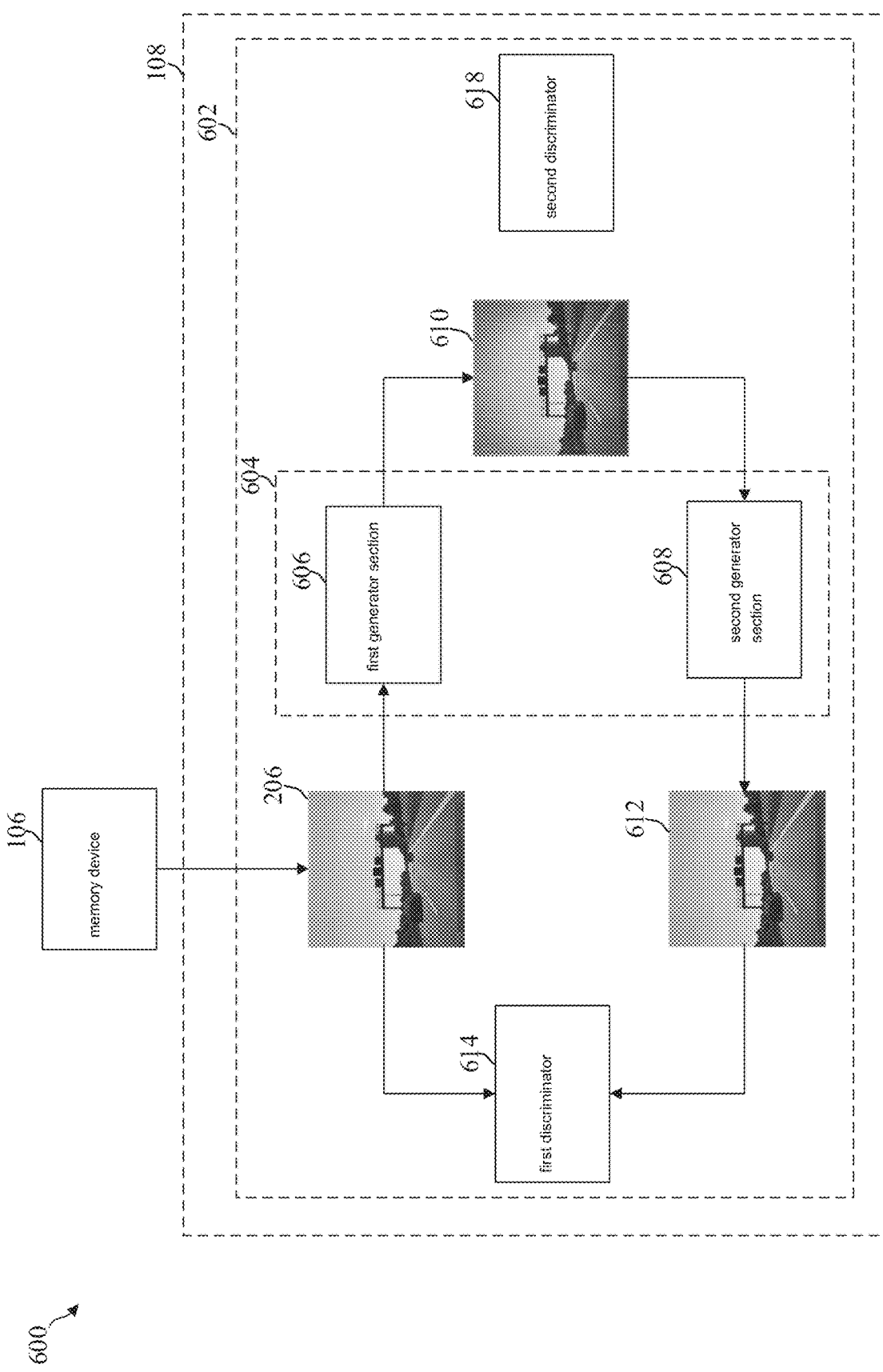

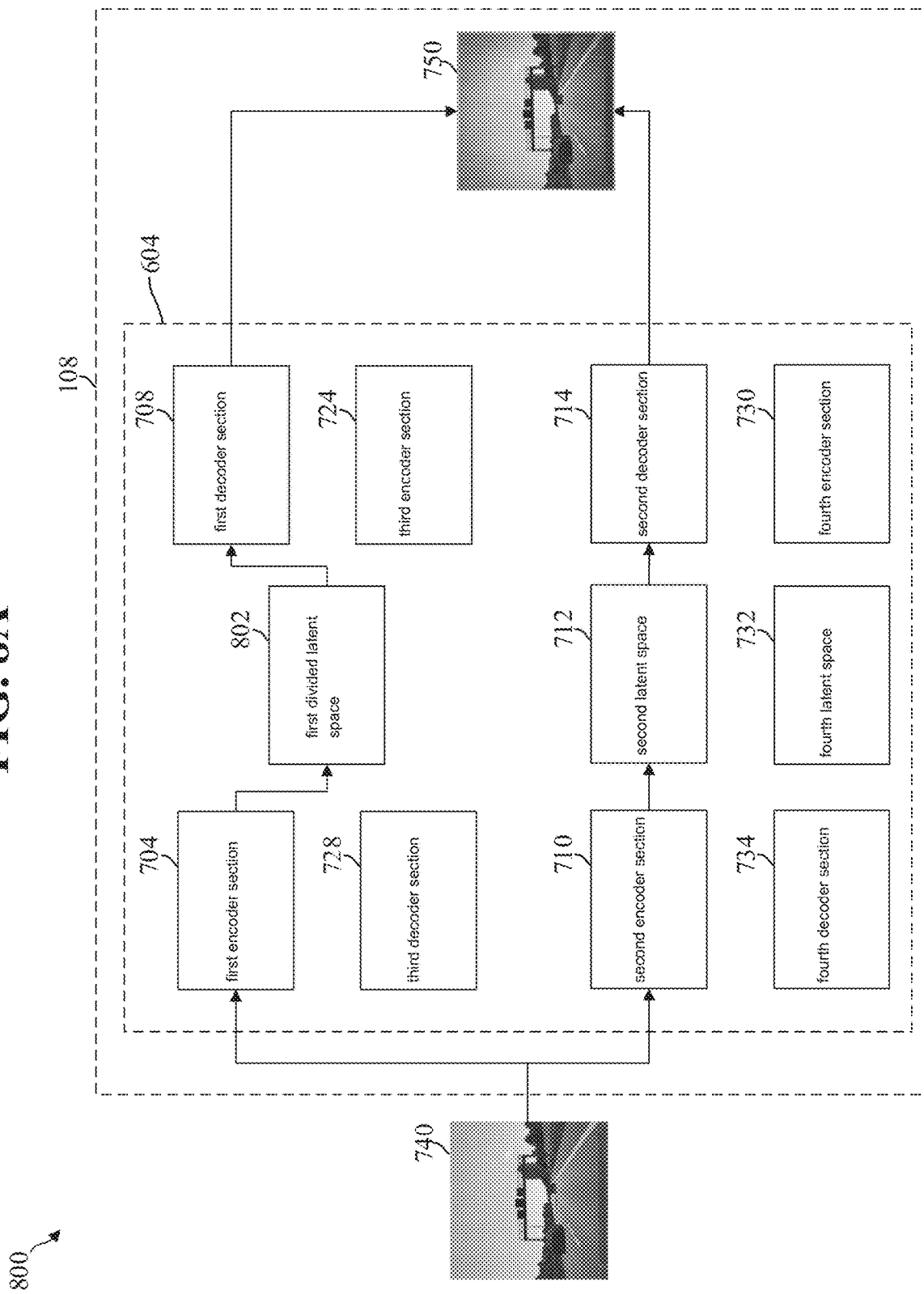

DEVICE AND METHOD FOR TRAINING A MODEL, AND A VEHICLE

CROSS REFERENCE

The present application claims the benefit under 35 U.S.C. § 119 of German Patent Application No. DE 102019213547.1 filed on Sep. 5, 2019, which is expressly incorporated herein by reference in its entirety.

FIELD

Different exemplary embodiments relate in general to a device and to a method for training a model.

BACKGROUND INFORMATION

Imaging sensors such as, for example, camera sensors and video sensors detect digital images with increasingly higher resolution. During autonomous driving, for example, it is necessary for imaging sensors to be able to process large volumes of data in order to preserve the necessary pieces of detailed information in the processed data, so that objects such as, for example, road signs, pedestrians, obstacles, etc. may be recognized and, for example, to control the vehicle as a function of the identified objects. In this context, models such as, for example, neural networks are often used for object recognition.

However, the processing of the data for object recognition using models requires a large amount of memory during the internal calculations. The processable volume of data for a network passage is therefore limited. This results in limitations such as, for example, in the data quality, image size, the time scale, etc. It may therefore be necessary that a model for the processing of data requires less memory for the internal calculations.

In Zhu et al., "Unpaired Image-to-Image Translation using Cycle-Consistent Adversarial Networks," arXiv: 1703.10593, 2018, a method is described for the unpaired image-to-image translation using two coupled GAN (generative adversarial network) neural networks.

In Liu et al., "Unsupervised Image-to-Image Translation Networks," arXiv:1703.00858, 2018, a method is described for the unpaired image-to-image translation using two coupled GAN, the encoder of the first GAN and of the second GAN mapping into a shared latent space.

A method for predicting traffic situations is described in German Patent Application No. DE 10 2016 225 772 A1.

A method for operating a data evaluation system for motor vehicle functions is described in German Patent Application No. DE 10 2017 116 016 A1.

A neural network for generating a representation of surroundings is described in German Patent Application No. DE 10 2017 201 226 A1.

A method for developing a classifier for machine operations is described in German Patent Application No. DE 11 2015 003 762 T5.

SUMMARY

An example method and device in accordance with example embodiments of the present invention have the object of training a model in such a way that the trained model has a reduced internal memory requirement during the processing of data.

A model may be any type of algorithm based on mathematical logic, which provides an output based on an input using the algorithm. The model may include a matrix multiplication or a principal component analysis. A model may include a neural network. A neural network may be any type of neural network such as, for example, an auto-encoder network or a CNN (convolutional neural network). The neural network may have an encoder function and a decoder function. The neural network may have any number of layers and the training of the neural network, i.e., the adaptation of the layers of the neural network, may be based on any type of training principle such as, for example, backpropagation, i.e., a backpropagation algorithm.

In accordance with a first example of the present invention, a method is provided for the computer-implemented training of a model, which includes a first sub-model and a second sub-model:

in which digital data are down-scaled in such a way that first input data are generated;
in which the digital data are divided into multiple data areas in such a way that second input data are generated;
in which the first sub-model generates first sub-model data relating to first input data fed to the first sub-model;
in which the first sub-model data are up-scaled to form first output data;
in which the second sub-model for the data areas generates corresponding output data areas relating to second input data fed to the second sub-model;
in which the output data areas are assembled to form second output data;
in which the first output data and the second output data are combined to form third output data;
in which the first sub-model is trained by comparing provided target data, which are assigned to the digital data (104), and the first output data; and
in which the second sub-model is trained by comparing the target data and the third output data.

The digital data may be sensor-detected data. The feature described in this paragraph in combination with the first example forms a second example.

The first sub-model and/or the second sub-model may be computer-implemented. The features described in this paragraph in combination with the first example or the second example form a third example.

The first sub-model may generate first sub-model data relating to the fed first input data, which have the same resolution as the first input data. The feature described in this paragraph in combination with one of the first example to the third example forms a fourth example.

The first sub-model and/or the second sub-model may include an auto-encoder. The features described in this paragraph in combination with one of the first example to the fourth example, form a fifth example.

The first sub-model and/or the second sub-model may include a matrix multiplication, a principal component analysis or a neural network. The features described in this paragraph in combination with one of the first example to the fifth example form a sixth example.

Calculation parameters of the first sub-model and/or calculation parameters of the second sub-model may be stored in the at least one memory. The calculation parameters of the first sub-model and the calculation parameters of the second sub-model may include weightings and/or activations. The features described in this paragraph in combination with one of the first example to the sixth example form a seventh example.

The digital data may include imaging sensor data, radar sensor data, LIDAR sensor data, vehicle dynamic-specific sensor data or engine-specific sensor data. The vehicle dynamic-specific sensor data may include a velocity, an acceleration, or an angle. The engine-specific sensor data may include an accelerator position, an injection quantity, a temperature, or a rotational speed. The digital data may further include or be ultrasonic sensor data or thermal sensor data. The features described in this paragraph in combination with one of the first example to the seventh example form an eighth example.

The digital data may include one of the following digital data types: image data, point clouds or time series. The features described in this paragraph in combination with one of the first example to the eighth example form a ninth example.

The first input data may include global (large-scale) pieces of information of the digital data. The feature described in this paragraph in combination with one of the first example to the ninth example forms a tenth example.

The down-scaling of the digital data may include the reduction of the scaling. The reduction of the scaling of the digital data may include the reduction of the scaling by a scaling factor of 4 to 8. The down-scaling of the digital data has the effect that on the one hand the model requires less memory for the internal calculations and, on the other hand, that a reduced computational effort is required for processing the digital data. The memory requirement drops proportionately to $1/S^d$, S indicating the scaling factor and d indicating the spatial dimension, d being equal to 1 if the digital data include time series, d being equal to 2 if the digital data include image data, and d being equal to 3 if the digital data include three-dimensional spatial grids. The features described in this paragraph in combination with one of the first example to the tenth example form an eleventh example.

The second input data may include local (small-scale) pieces of information of the digital data. The feature described in this paragraph in combination with one of the first example to the eleventh example forms a twelfth example.

The second sub-model may generate second sub-model data relating to the fed second input data, an associated output data area of the multiple output data areas being able to be generated for each data area of the multiple data areas. The features described in this paragraph in combination with one of the first example to the twelfth example form a thirteenth example.

The division of the digital data into multiple data areas may include the division of the digital into multiple data areas according to a division key. The division of the digital data into multiple data areas may include the division of the digital data into 16 to 64 data areas. The division of the digital data has the effect that, on the one hand, the model requires less memory for the internal calculations and, on the other hand, that a reduced computational effort is required for processing the digital data. The features described in this paragraph in combination with one of the first example to the thirteenth example form a fourteenth example.

Each data area of the multiple data areas may have the same scaling. The scaling of each data area of the multiple data areas may correspond to the scaling of the first input data. In other words, the digital data may be divided into multiple data areas based on a uniform grid. The features described in this example in combination with one of the first example to the fourteenth example form a fifteenth example.

Each first output datum of the first output data may be assigned exactly one digital datum of the digital data and each second output datum of the second output data may be assigned exactly one digital datum of the digital data. The features described in this paragraph in combination with one of the first example to the fifteenth example form a sixteenth example.

The scaling of the first sub-model data may correspond to the scaling of the first input data. The feature described in this paragraph in combination with one of the first example to the sixteenth example forms a seventeenth example.

The up-scaling of the first sub-model data may include the enlargement of the scaling. The features described in this paragraph in combination with one of the first example to the seventeenth example form an eighteenth example.

The scaling of the first output data may correspond to the scaling of the target data. The feature described in this paragraph in combination with one of the first example to the eighteenth example form a nineteenth example.

The scaling of the target data may correspond to the scaling of the digital data. The feature described in this paragraph in combination with one of the first example to the nineteenth example forms a twentieth example.

The output data areas may include multiple output data areas. Each output data area of the multiple output data areas may be assigned exactly one data area of the multiple data areas. The scaling of each output data area of the multiple output data areas may correspond to the scaling of the assigned data area of the multiple data areas. The assembling of the output data areas to form second output data may include the assembling of the multiple output data areas based on the division key. The features described in this paragraph in combination with one of the first example to the twentieth example form a twenty-first example.

The scaling of the second output data may correspond to the scaling of the first output data. The feature described in this paragraph in combination with one of the first example to the twenty-first example forms a twenty-second example.

The combining of the first output data and the second output data to form third output data may include the summation of the first output data and the second output data. The feature described in this paragraph in combination with one of the first example to the twenty-second example forms a twenty-third example.

The combining of the first output data and the second output data to form third output data may include the weighted summation of the first output data and the second output data. The feature described in this paragraph in combination with the twenty-third example forms a twenty-fourth example.

The summation of the first output data and the second output data may include the summation of each first output datum of the first output data with the assigned second output datum of the second output data. The feature described in this paragraph in combination with the twenty-second example or with the twenty-fourth example forms a twenty-fifth example.

The scaling of the third output data may correspond to the scaling of the target data. The feature described in this paragraph in combination with one of the first example to the twenty-fifth example forms a twenty-sixth example.

The training of the first sub-model onto the digital data may include the ascertainment of a first loss value by comparing the first output data with the target data and may include the adaptation of the first sub-model based on the first loss value. The first loss value may be ascertained using a first loss function. The adaptation of the first sub-model may include the minimization of the first loss value. This means, the first sub-model is trained in such a way that it represents preferably exactly the target data. This has the effect that the first sub-model is able, for example, to learn the representation of large, in particular, homogenous surfaces and/or primary color assignments. The features described in this paragraph in combination with one of the first example to the twenty-sixth example form a twenty-seventh example.

The training of the second sub-model onto the digital data may include the ascertainment of a second loss value by comparing the third output data with the target data and may include the adaptation of the second sub-model based on the second loss value. The second loss value may be ascertained using a second loss function. The adaptation of the second sub-model may include the minimization of the second loss value. This means that the second sub-model represents a differential mask between the first output data and the target data, so that by combining the first output data with the second output data, third output data representing the target data may be generated. In other words, the second sub-model learns a difference between the first output data generated by the first sub-model and the target data. This has the effect that in contrast to the first output data, the third output data reflect the details of the target data. This has the further effect that the second sub-model is able, for example, to learn the representation of edges and/or microstructures. The features described in this paragraph in combination with one of the first example to the twenty-seventh example form a twenty-eight example.

The target data may correspond to the digital data. The feature described in this paragraph in combination with one of the first example to the twenty-eighth example forms a twenty-ninth example.

The method may further include the generation of third input data. The third input data may include multiple second data areas of the digital data. The method may include the generation of multiple second output data areas for the multiple second data areas by a third sub-model. The method may include the assembling of the multiple second output data areas to form fourth output data. The method may include the combining of the third output data and the fourth output data to form fifth output data. The method may include the training of the third sub-model onto the digital data using the target data and the fifth output data. The third sub-model may include an auto-encoder. The third sub-model may include a matrix multiplication, a principal component analysis or a neural network. The features described in this paragraph in combination with one of the first example to the twenty-ninth example form a thirtieth example. It should be noted that the method may include an arbitrary number of iterations (for example, with a fourth sub-model, a fifth sub-model, a sixth sub-model, a seventh sub-model, etc.) and corresponding additional sub-models.

Calculation parameters of the third sub-model may be stored in the at least one memory. The calculation parameters of the third sub-model may include weightings and/or activations. The features described in this paragraph in combination with the thirtieth example form a thirty-first example.

The scaling of the data areas of the multiple second data areas may be smaller than the scaling of the data areas of the multiple data areas. The feature described in this paragraph in combination with the thirtieth example or the thirty-first example forms a thirty-second example.

The third sub-model may generate third sub-model data relating to the fed third input data, an associated second output data area of the multiple second output data areas being generated for each second data area of the multiple second data areas. The features described in this paragraph in combination with one of the thirtieth example to the thirty-second example form a thirty-third example.

The model may be a generative model. The digital data may be associated with a first domain and the third output data may be associated with a second domain. The method may further include the generation of training data by the trained model. The method may include the training of a second model using the generated training data. The features described in this paragraph in combination with one of the first example to the thirty-third example form a thirty-fourth example.

The method may further include the processing of second digital data by the second model in a driving assistance system. The second digital data may be associated with the second domain. The method may further include the controlling of a vehicle based on the processed second digital data. The features described in this paragraph in combination with the thirty-fourth example form a thirty-fifth example.

In accordance with the present invention, a device may include a model. The model according to the method may have been trained according to one of the first example to the thirty-third example. The trained model may be used in order, for example, to code, to transform or to transmit digital data (for example, measured data, for example, simulation data) into another domain. This means the digital data may be coded, transformed or transmitted into another domain in a memory-efficient manner. The device including the features described in this paragraph forms a thirty-seventh example.

The device may further include a second model. The second model according to the method may have been trained according to the thirty-fourth example. The features described in this paragraph in combination with the thirty-seventh example form a thirty-eighth example.

In accordance with the present invention, a device may include a sub-model of the model, for example, the first sub-model, the second sub-model and/or the third sub-model, the model including the first sub-model and the second sub-model and optionally the third sub-model according to the method and optionally one or multiple additional sub-models possibly having been trained according to one of the first example to the thirty-second example. The first output data generated based on digital image data using the trained first sub-model may be processed, for example, by a segmentation network, the segmentation network being able to output segmented digital image data. The second output data or third output data generated using the trained second sub-model and/or trained third sub-model may be used for recognizing edge structures and/or object structures. The device including the features described in this paragraph forms a thirty-ninth example.

The first sub-model, the second sub-model and/or the third sub-model may be a neural network. The features described in this paragraph in combination with one of the thirty-sixth example to the thirty-ninth example form a fortieth example.

The second model may be a neural network. The feature described in this paragraph in combination with one of the thirty-eighth example to the fortieth example forms a forty-first example.

In accordance with the present invention, a system may include a device according to one of the thirty-sixth example to the forty-first example. The system may further include a sensor. The sensor may be configured to provide the digital data to the device. The system including the features described in this paragraph forms a forty-second example.

In accordance with the present invention, a system may include a GAN (generative adversarial network). The GAN may include multiple generator networks. At least one generator network of the multiple generator networks may have been trained according to one of the first example to the thirty-fifth example. This has the effect that the trained generator network with the same memory capacity is able to process digital data having a greater memory requirement such as, for example, a higher data quality or a larger image size, and thus is able to generate digital data having a higher data quality or a larger image size. The system including the features described in this paragraph forms a forty-third example.

In accordance with the present invention, a computer program may include program instructions which, when they are executed by one or by multiple processors, are configured to carry out the method according to one or multiple of the first example to the thirty-fifth example. The feature described in this paragraph forms a forty-fourth example.

In accordance with the present invention, the computer program may be stored in a machine-readable memory medium. The feature described in this paragraph in combination with the forty-fourth example forms a forty-fifth example.

In accordance with the present invention, a vehicle may include at least one sensor, which is configured to provide digital data. The vehicle may further include a driving assistance system. The driving assistance system may include a model trained according to one of the first example to the thirty-fifth example. The model may be configured to process the digital data. The driving assistance system may be configured to control the vehicle based on the processed digital data. The vehicle including the features described in this paragraph forms a forty-sixth example.

In accordance with the present invention, a vehicle may include at least one sensor, which is configured to provide digital data. The vehicle may further include a driving assistance system. The driving assistance system may include a second model trained according to the thirty-fourth example. The second model may be configured to process the digital data. The driving assistance system may be configured to control the vehicle based on the processed digital data. The vehicle including the features described in this paragraph forms a forty-seventh example.

Exemplary embodiments of the present invention are depicted in the figures and explained in greater detail below.

BRIEF DESCRIPTION OF THE DRAWINGS

FIGS. 6A and 6B show a processing system for training a GAN network according to different specific embodiments of the present invention.

FIGS. 8A and 8B show a generator section of a GAN network according to different specific embodiments of the present invention.

DETAILED DESCRIPTION OF EXAMPLE EMBODIMENTS

In one specific embodiment, a "circuit" may be understood to mean any type of logic-implemented entity, which may be hardware, software, firmware or a combination thereof. Thus, in one specific embodiment, a "circuit" may a hardwired logic circuit or a programmable logic circuit such as, for example, a programmable processor, for example, a microprocessor (for example, a CISC (processor including a large instruction set) or a RISC (processor including a reduced instruction set)). A "circuit" may also be software, which is implemented or executed by a processor, for example, any type of computer program, a computer program that uses a virtual machine code such as, for example, Java. Any other type of implementation of the respective functions, which are described in greater detail below, may be understood to mean a "circuit" in accordance with an alternative specific embodiment.

Different exemplary embodiments relate to a device and to a method for training a model in such a way that the trained model requires less memory for the internal calculations during the processing of digital data. This means that the trained model with an unvarying internal memory capacity is able to process digital data having a greater memory requirement such as, for example, a higher data quality or a larger image size.

Figure 1:
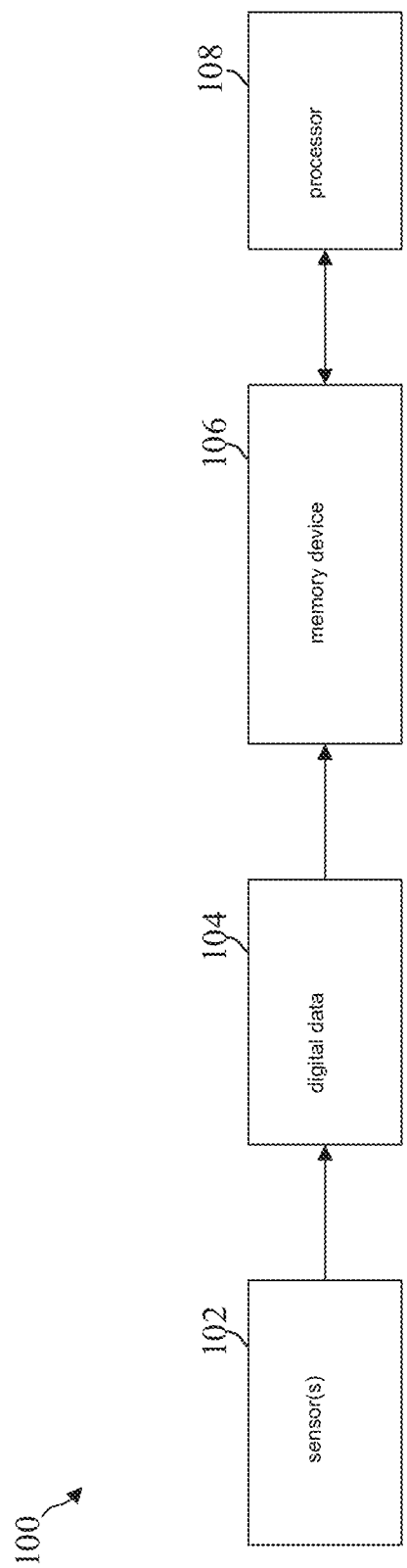
FIG. 1 shows a device according to different specific embodiments of the present invention.

FIG. 1 depicts a system 100 according to different specific embodiments. System 100 may include one or multiple sensors 102. Sensor 102 may be configured to provide digital data 104, i.e., digital data 104 may include sensor-detected data. Sensor 102 may be an imaging sensor such as, for example, a camera sensor or a video sensor, or a remote location sensor such as, for example, a radar sensor, a LIDAR sensor or an ultrasonic sensor, or a thermal sensor. According to different specific embodiments, digital data 104 include digital image data. Digital data 104 may include vehicle-dynamic sensor data of a vehicle, sensor 102 capable of being a velocity sensor, an acceleration sensor or an angle sensor. Digital data 104 may include engine-specific sensor data of a vehicle, sensor 102 capable of being a sensor for detecting an accelerator position, an injection quantity, a temperature, or a rotational speed. According to different specific embodiments, sensor 102 includes another type of sensor. The sensors of the multiple sensors may include the same type or different types of sensors.

System 100 may further include a memory device 106. Memory device 106 may include at least one memory. The memory may, for example, be used during the processing carried out by a processor. A memory used in the specific embodiments may be a volatile memory, for example, a DRAM (dynamic random access memory), or a non-volatile memory, for example a PROM (programmable read-only memory), an EPROM (erasable programmable read-only memory), and EEPROM (electrical erasable programmable read-only memory) or a flash memory such as, for example, a memory unit including a floating gate, a charge-trapping memory unit, a MRAM (magneto-resistive random access memory) or a PCRAM (phase change random access memory). Memory unit 106 may be configured to store digital data 104. System 100 may further include at least one processor 108. Processor 108 may, as described above, be any type of circuit, i.e., any type of logic-implemented entity. Processor 108 may be a graphic processor (GPU) and the graphic processor may use an assigned graphic memory (video-RAM) during the data processing. In different specific embodiments, processor 108 is configured to process digital data 104.

The exemplary embodiments are described below with reference to digital images as digital data 104. It should be noted, however that also (digital) data of other data types may be used, for example, point clouds or time series.

Figure 2:
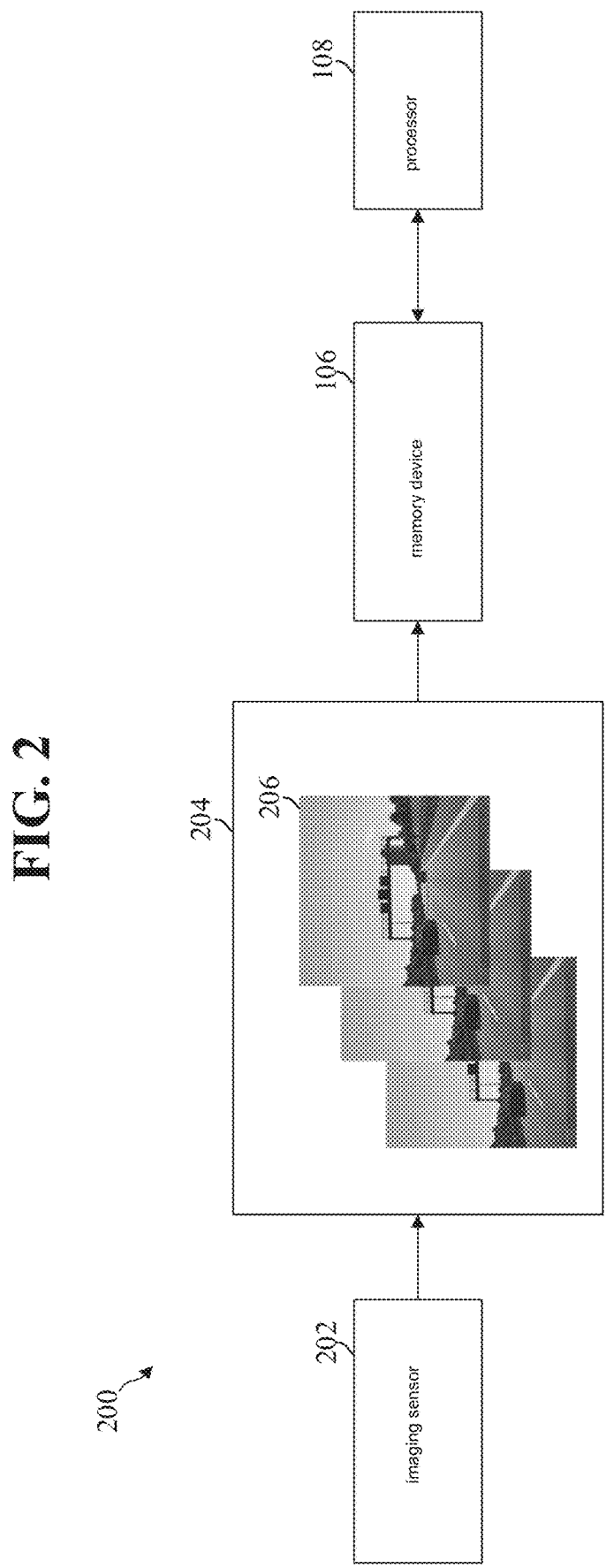
FIG. 2 shows an imaging device according to different specific embodiments of the present invention.

FIG. 2 depicts an imaging system 200 according to different specific embodiments, in which sensor 102 is implemented as imaging sensor 202. Imaging sensor 202 may be a camera sensor or a video sensor. Imaging sensor 202 may be configured to provide digital image data 204. Digital image data 204 include at least one digital image 206, for example, multiple digital images. Each digital datum of digital image 206 may include one pixel of multiple pixels or may be formed by such a pixel. According to different specific embodiments, imaging system 200 includes multiple imaging sensors. Imaging system 200 may further include memory device 106 for storing digital image data 204. Imaging system 200 may include at least one processor 108, which is configured to process digital image data 204.

Figure 3:
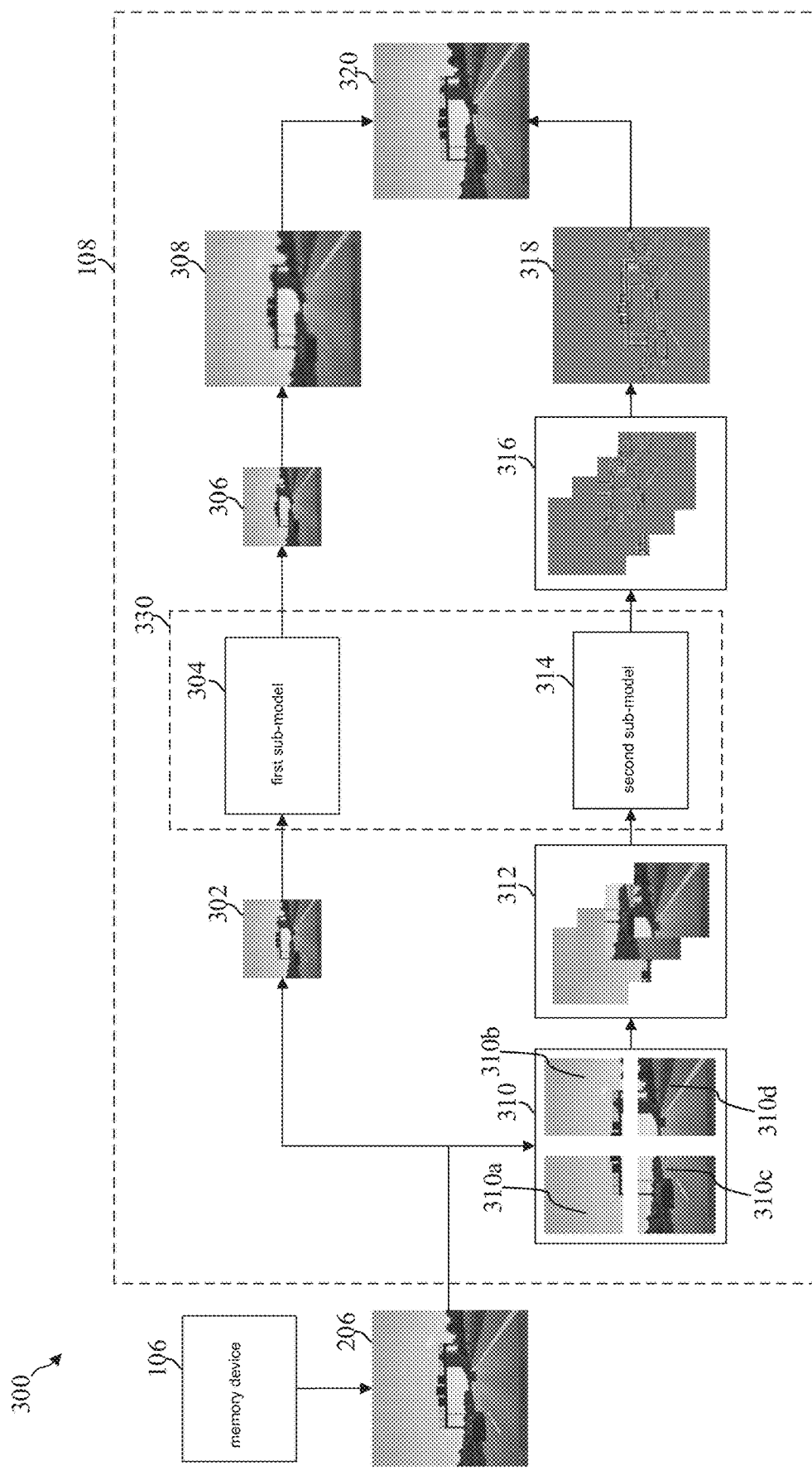
FIG. 3 shows a processing system according to different specific embodiments of the present invention.

FIG. 3 depicts a processing system 300 according to different specific embodiments. Processing system 300 may include the memory device for storing digital image data 204 such as, for example, digital image 206. Processing system 300 may further include the at least one processor 108. Processor 108 may be configured to process digital image 206. Processor 108 may use memory device 106 during the data processing. Processor 108 may use at least one memory of memory device 106 during the data processing, the used at least one memory being capable of differing from the memory used for storing digital image 206. Processor 108 may be configured to generate first input data 302 based on digital image 206. First input data 302 may be stored in memory device 106. First input data 302 may be generated by down-scaling digital image 206. The down-scaling of digital image 206 may include the reduction of the resolution (for example, from 2048×2048 pixels to 512×512 pixels, for example, from 1024×1024 pixels to 256×256 pixels). The reduction of the scaling or of the resolution of digital image 206 may include a scaling factor in the range of 4 to 8. According to different specific embodiments, the scaling of the height and the scaling of the width are differently reduced. In other words, the height of digital image 206 is reduced based on a height scaling factor and the width of digital image 206 is reduced based on a width scaling factor. When down-scaling digital image 206, all global, i.e., large-scale, pieces of information of digital image 206 in first input data 302 are maintained; pieces of detailed information (i.e., local, small-scale pieces of information) may, however, be lost.

Processor 108 implements at least one part of a model 330. Processor 108 may implement at least one part of a first sub-model 304. First sub-model 304 may include a matrix multiplication, a principal component analysis or a neural network. First sub-model 304 may be an auto-encoder network. First sub-model 304 may be configured to process first input data 302, i.e., down-scaled digital image 206. First sub-model 304 may be configured to generate first sub-model data 306 relating to first input data 302 fed to first sub-model 304. First sub-model data 306 may be stored in memory device 106. The resolution of first sub-model data 306 may correspond to the resolution of first input data 302.

Processor 108 may be configured to process first sub-model data 306 and may be further configured to generate first output data 308 based on first sub-model data 306. Each pixel from multiple pixels of first output data 308 may be assigned exactly one pixel of digital image 206. First output data 308 may be generated by up-scaling first sub-model data 306. The up-scaling of first sub-model data 306 may include increasing the resolution (for example, from 512×512 pixels to 2048×2048 pixels, for example, from 256×256 pixels to 1024×1024). The up-scaling may be based on any type of method capable of increasing a resolution. The up-scaling may include an interpolation. The upscaling may include a maximum-likelihood method such as, for example, a super-resolution. An additional neural network or an additional neural sub-network may be configured to up-scale sub-model data such as, for example first sub-model data 306. First output data 308 may be stored in memory device 106. The calculation parameters of first sub-model 304 may be stored in the at least one memory of memory device 106 (for example, in the graphic memory used by the graphic processor during the processing). The calculation parameters of first sub-model 304 may include weightings and/or activations. According to different specific embodiments, first sub-model 304 includes a first neural sub-network, the weightings and the activations of the respective layers of the first neural sub-network being stored in the at least one memory of memory device 106.

Processor 108 may further be configured to generate second input data 312 based on digital image 206. Processor 108 may be configured to divide digital image 206 into multiple data areas 310 such as, for example, multiple image areas 310*a*, 310*b*, 310*c*, 310*d*. The image areas of multiple image areas 310*a*, 310*b*, 310*c*, 310*d* may overlap, i.e., one pixel of the multiple pixels of digital image 206 may be assigned to more than one image area. Multiple image areas 310*a*, 310*b*, 310*c*, 310*d* may include all pixels of the multiple pixels of digital image 206. The image areas may be generated based on a division key. This means digital image 206 may be divided into multiple image areas 310*a*, 310*b*, 310*c*, 310*d* based on the division key. Digital image 206 may, for example, be divided into 16 to 64 image areas. Each image area of multiple image areas 310*a*, 310*b*, 310*c*, 310*d* may have the same resolution. The resolution of each image area of multiple image areas 310*a*, 310*b*, 310*c*, 310*d* may correspond to the resolution of first input data 302. As described above, all global, i.e., large-scale, pieces of information of digital image 206 are maintained in first input data 302 when down-scaling digital image 206. When dividing digital image 206 into image areas, the pieces of detailed information, i.e., local, small-scale pieces of information of digital image 206 are maintained in first input data 302; the global, large-scale pieces of information may, however, be lost. Processor 108 may be configured to generate second input data 312 based on multiple image areas 310*a*, 310*b*, 310*c*, 310*d*, second input data 312 being able to include a stack of image areas. The division key may establish the sequence of the image area in the stack of image area. Second input data 312 may be stored in memory device 106.

Processor 108 may implement at least one part of a second sub-model 314. Second sub-model 314 may include a matrix multiplication, a principal component analysis or a neural network. Second sub-model 314 may be an auto-encoder network. Second sub-model 314 may be configured to process second input data 312. Second sub-model 314 may be configured to generate corresponding output data areas for the data areas of second input data 312 fed to second sub-model 314. The output data areas may be stored in memory device 106. Second sub-model 314 may be configured to process each image area of multiple image areas 310a, 310b, 310c, 310d of second input data 312 and, based on the image area, to generate one output data area from multiple output data areas. This means, each output data area may be assigned to exactly one image area. The image areas of multiple image areas 310a, 310b, 310c, 310d may be processed in the sequence established by the stack of image areas. The resolution of each output data area of the multiple output data areas may correspond to the resolution of the assigned image area of multiple image areas 310a, 310b, 310c, 310d. Second sub-model 314 may be configured to generate second sub-model data 316 relating to second input data 312, for each data area of the multiple data areas an associated output data area of the multiple data areas being generated. In other words, second input data 312 may include each data area of digital image 206 and second sub-model 314 may generate an associated output data area for each data area. The exemplary embodiments are described below with reference to second sub-model 316, i.e., for the processing of each data area of the multiple data areas (for example, of the multiple image areas). It should be noted, however, that only a portion of the data areas of digital image 206 may also be processed. The calculation parameters of second sub-model 314 may be stored in the at least one memory of memory device 106 (for example, of the graphic memory used by a graphic processor during the processing). The calculation parameters of second sub-model 314 may include weightings and/or activations. According to different specific embodiments, second sub-model 314 includes a second neural sub-network, the weightings and the activations of the respective layers of the second neural sub-network being stored in the at least one memory of memory device 106.

Processor 108 may be further configured to assemble the output data areas such as, for example, the output data areas of second sub-model data 316 to form second output data 318. The multiple output data areas may be assembled based on the division key. The multiple output data areas may be assembled based on the sequence established by the stack of image areas and on the division key. The resolution of second output data 318 may correspond to the resolution of first output data 308. Each pixel from multiple pixels of second output data 318 may be assigned exactly one pixel of digital image 206. Second output data 318 may be stored in memory device 106.

Processor 108 may be configured to combine first output data 308 and second output data 318 to form third output data 320. Third output data 320 may be generated by summation, for example, by a weighted summation, of first output data 308 and of second output data 318. Third output data 320 may be generated by adding each pixel of the multiple pixels of the first output data to the assigned pixel of the multiple pixels of the second output data (for example, added in a weighted manner). This means that the third output data includes both the large-scale pieces of information contained in first output data 308 as well as the small-scale pieces of information contained in second output data 318. If radar sensor data are used instead of imaging sensor data, this has the effect that both reflection data, which include small-scale pieces of information, as well as the distance-dependent noise behavior of a radar sensor, which includes large-scale pieces of information, may be processed by the model and that the third output data include these pieces of information.

Figure 4:
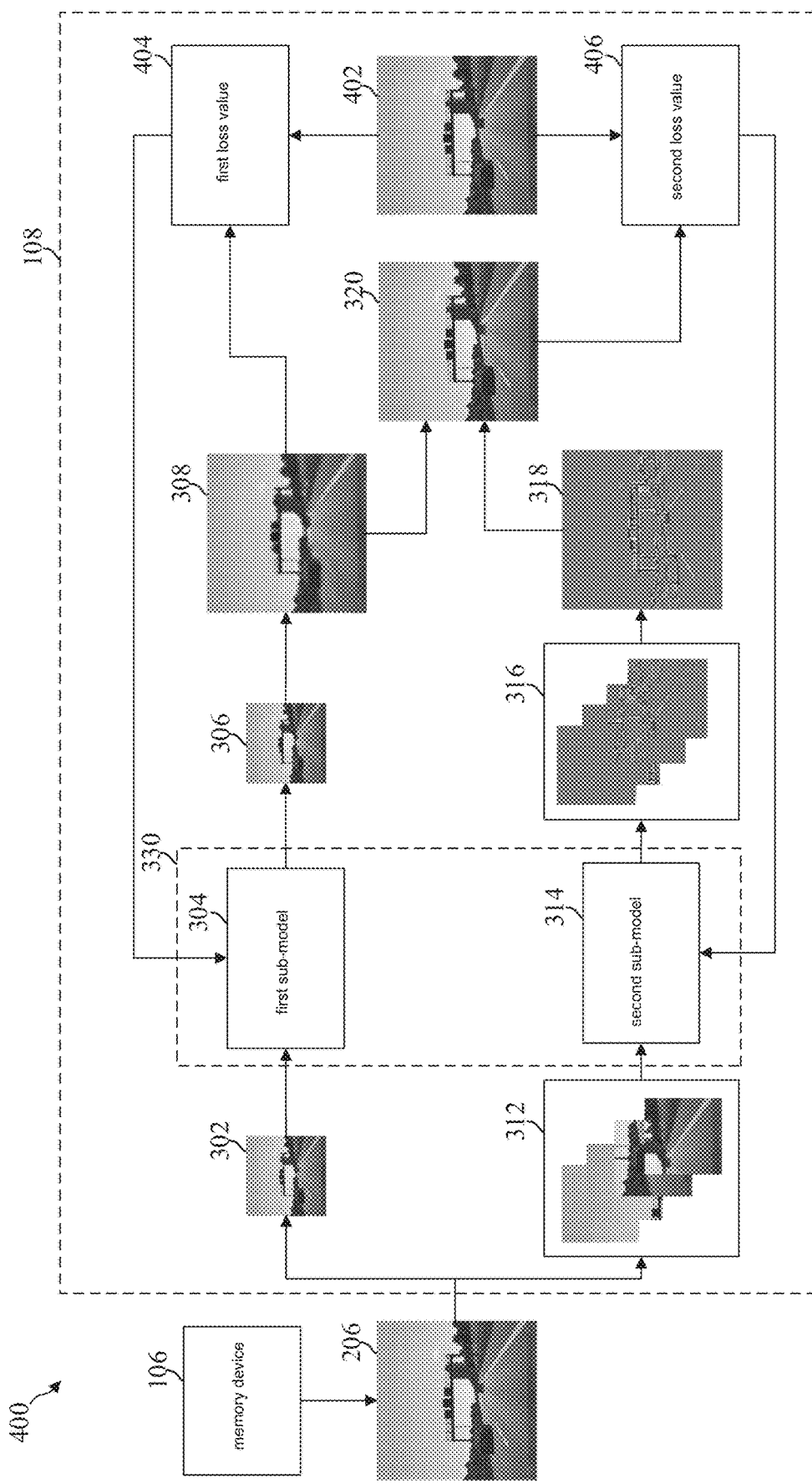
FIG. 4 shows a processing system for training a model according to different specific embodiments of the present invention.

FIG. 4 depicts a processing system 400 for training a model according to different embodiments. Processing system 400 may correspond essentially to processing system 300, processor 108 further being configured to train, i.e., to adapt, first sub-model 304 and second sub-model 314. Processor 108 may be configured to train first sub-model 304 on the digital data such as, for example, digital image 206, using provided target data 402, which may be assigned to the digital data, and first output data 308. Processor 108 may be configured to adapt first sub-model 304 by comparing first output data 308 with target data 402. The resolution of first output data 308 may correspond to the resolution of target data 402. The resolution of target data 402 may correspond to the resolution of digital image 206. Processor 108 may be configured to ascertain a first loss value 404 by comparing first output data 308 with target data 402. First loss value 404 may be ascertained based on a loss function. The loss function may be any type of loss function such as, for example, pixel-by-pixel loss function (for example, based on a difference in color values). The loss function may include or be expanded by multiple different loss functions. The loss function may include a Kuhlback-Leibler divergence. Processor 108 may be configured to adapt first sub-model 304 based on first loss value 404. Processor 108 may be configured to adapt first sub-model 304 in such a way that first loss value 404 is minimized.

Processor 108 may be further configured to train second sub-model 314 on the digital data such as, for example, digital image 206, using target data 402 and third output data 320. Processor 108 may be configured to adapt second sub-model 314 by comparing third output data 320 with target data 402. The resolution of third output data 320 may correspond to the resolution of target data 402. Processor 108 may be configured to ascertain a second loss value 406 by comparing third output data 320 with target data 402. Second loss value 406 may be ascertained based on a loss function. The loss function may be any type of loss function such as, for example, a pixel-by-pixel loss function (for example, based on a difference in color values). The loss function may include or be expanded by multiple different loss functions. The loss function may include a Kuhlback-Leibler divergence. Processor 108 may be configured to adapt second sub-model 314 based on second loss value 406. Processor 108 may be configured to adapt second sub-model 314 in such a way that second loss value 406 is minimized. Target data 402 may correspond to digital image 206.

According to different specific embodiments, processor 108 further implements at least one part of a third sub-model. Processor 108 may be configured to divide digital image 206 into a multiple second image areas, the multiple second image areas being capable of differing from multiple image areas 310a, 310b, 310c, 310d. The resolution of the multiple second image areas may be smaller than the resolution of multiple image areas 310a, 310b, 310c, 310d. The processing of the multiple second image areas may correspond essentially to the processing of multiple image areas 310a, 310b, 310c, 310d. The processor may be configured to generate third input data based on the multiple second image areas. The third sub-model may be configured to process the third input data and to generate third sub-model data relating to the fed third input data, the third sub-model being able to include a second output data area from multiple second output data areas for each second image area of the multiple second image areas. Processor 108 may be configured to assemble the multiple second output data areas to form fourth output data. Processor 108 may be configured to generate fifth output data by combining third output data 320 and the fourth output data. Processor 108 may be configured to train the third sub-model on the digital data (for example, digital image 206) using the target data and the fifth output data. Processing system 400, as previously described above, may include an arbitrary additional number of sub-models, each sub-model of the additional sub-models being able to process multiple image areas, the resolution of the multiple image areas of each sub-model being smaller than the resolution of the multiple image areas of the respectively preceding sub-model. In other words, each additional sub-model processes image areas from multiple image areas that have a lower resolution.

Figure 5:
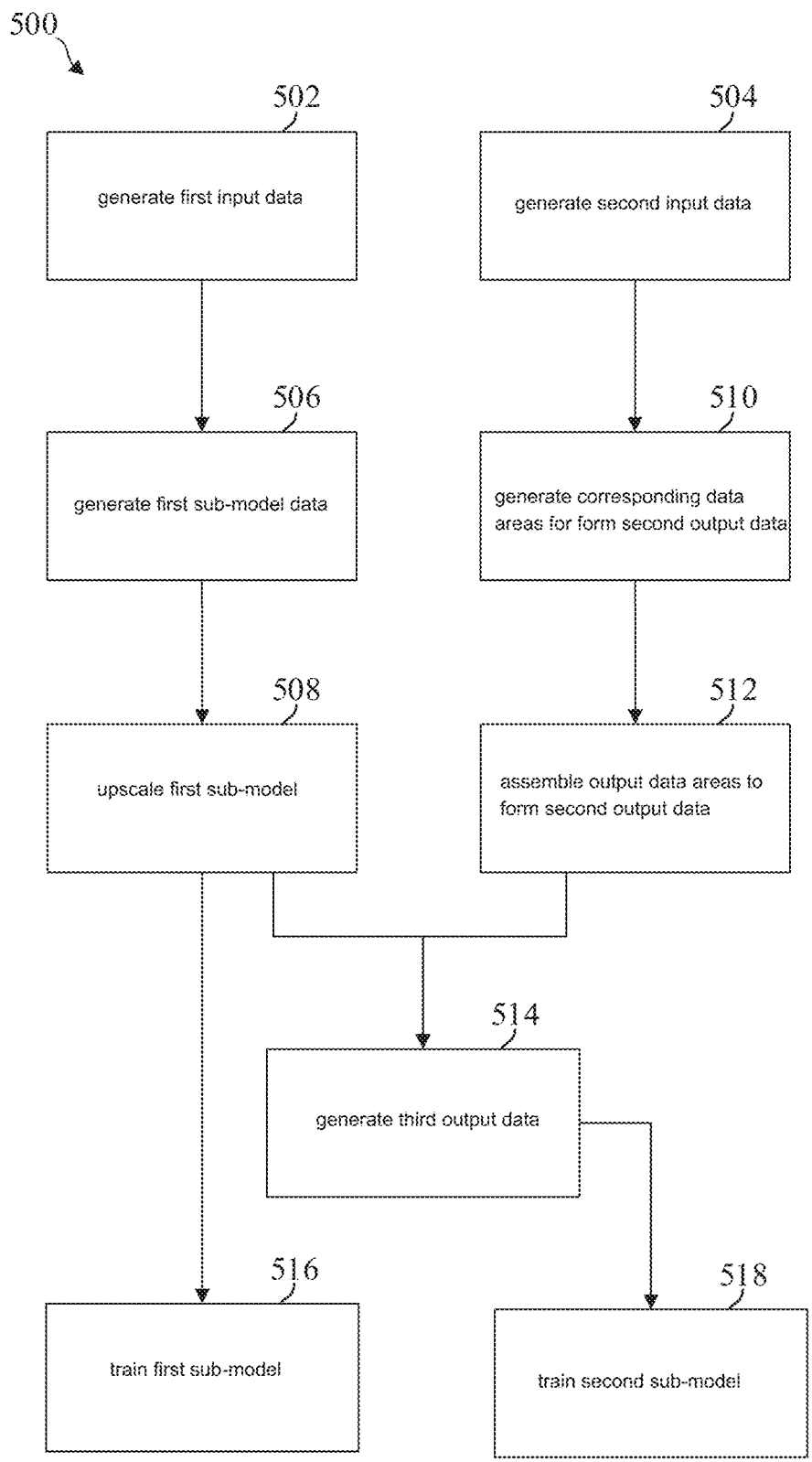
FIG. 5 shows a method for training a model according to different specific embodiments of the present invention.

FIG. 5 depicts a method 500 for training a model according to different specific embodiments. Method 500 may include the down-scaling of digital data, so that first input data 302 are generated (in 502). Method 500 may include the division of the digital data into multiple data areas, so that second input data 312 are generated (in 504). Multiple data areas 310 of the digital data may, for example, be multiple image areas 310a, 310b, 310c, 310d of digital image 206. Method 500 may further include the generation of first sub-model data 306 by first sub-model 304 relating to first input data 302 fed by first sub-model 304 (in 506). Method 500 may include the up-scaling of first sub-model 306 to first output data 308 (in 508). In method 500, a second sub-model 314 for the data areas may generate corresponding output data areas for second input data 312 fed to second sub-model 314 (in 510). Method 500 may include the assembling of the output data areas to form second output data 318 (in 512). Method 500 may include the generation of third output data 320 (in 514). First output data 308 and second output data 318 may be combined to form third output data 320. Method 500 may further include the training of first sub-model 304 (in 516). First sub-model 304 may be trained on the digital data by comparing provided target data 402, which may be assigned to the digital data, and first output data 308. Method 500 may include the training of second sub-model 314 (in 518). Second sub-model 314 may be trained on the digital data by comparing target data 402 and third output data 320.

Figure 6B:
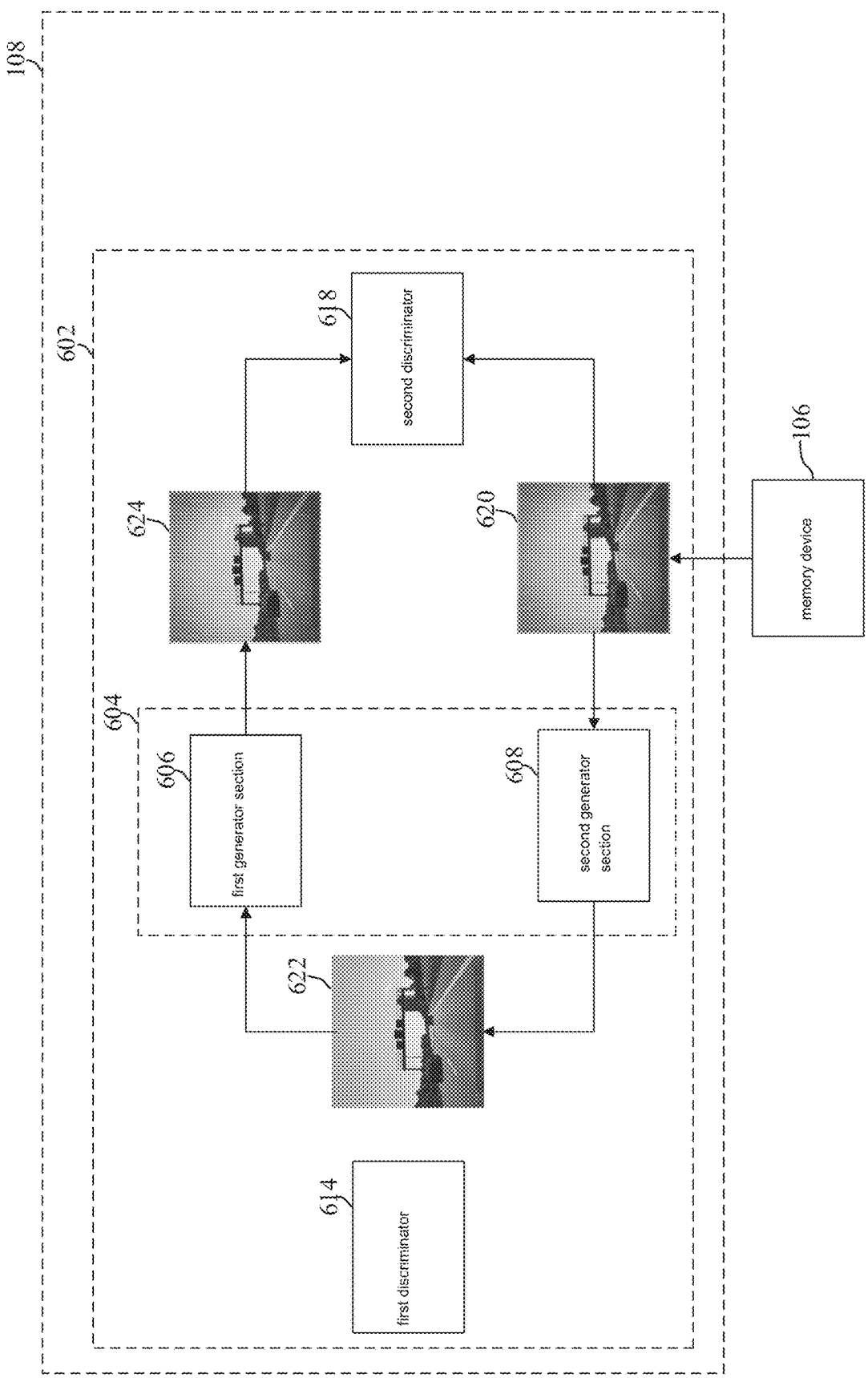

FIG. 6A and FIG. 6B depict a processing system 600 for training a GAN (generative adversarial network) according to different specific embodiments. As depicted in FIG. 6A, processing system 600 may include memory device 106 for storing digital image 206. Processing system 600 may include the at least one processor 108. Processor 108 may implement a GAN 602. GAN 602 may include a generator section 604. Generator section 604 may include a first generator section 606 and a second generator section 608. First generator section 606 may be configured to process digital data 104 of a first domain and to generate digital data 104 of a second domain. First generator section 606 may be configured to process digital image 206, digital image 206 being able to be associated with the first domain. The first domain may differ from the second domain. Digital images, which are assigned to a shared domain (for example, to the first domain), include a shared (for example, technical) field, a shared category or a shared feature. In other words, the digital images that are assigned to a shared domain may be assigned to a shared problem area. For example, the domain relating to the weather may differ, the first domain representing, for example, a scene in sunshine and the second domain representing, for example, the same scene in rain. For example, the domain may differ with respect to the season, the first domain representing, for example, a scene in the summer and the second domain representing, for example, the same scene in winter.

First generator section 606 may be configured to generate a second digital image 610 based on digital image 206, second digital image 610 being able to be associated with the second domain. Second generator section 608 may be configured to process digital data 104 of a second domain and to generate digital data 104 of a first domain. Second generator section 608 may be configured to process second digital image 610 and to generate a third digital image 612 based on second digital image 610. GAN 602 may further include a first discriminator 614 and a second discriminator 618. First discriminator 614 may be configured to adapt GAN 602 based on digital image 206 and on third digital image 612. As depicted in FIG. 6B, memory device 106 may further store a fourth digital image 620, fourth digital image 620 being able to be associated with the second domain. Second generator section 608 may generate a fifth digital image 622 based on fourth digital image 620, fifth digital image 622 being able to be associated with the first domain. First generator section 606 may generate a sixth digital image 624 based on fifth digital image 622, sixth digital image 624 being able to be associated with the second domain. Second discriminator 618 may be configured to adapt GAN 602 based on fourth digital image 620 and sixth digital image 624.

Figure 7:
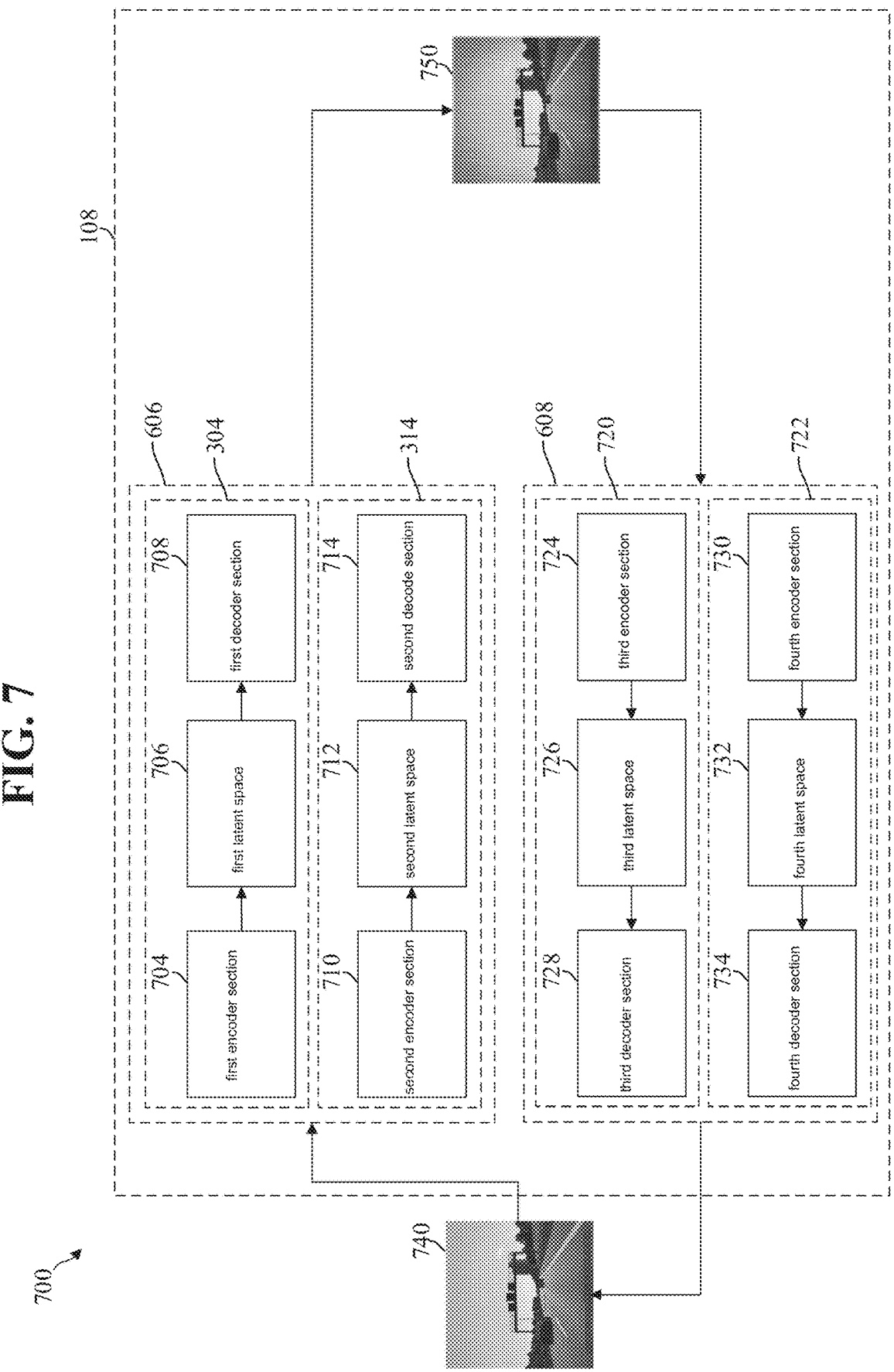
FIG. 7 shows a generator section of a GAN network according to different specific embodiments of the present invention.

FIG. 7 depicts generator section 700 of a GAN network according to different specific embodiments. Generator section 700 may correspond essentially to generator section 604 of processing system 600, first generator section 606 including first sub-model 304 and second sub-model 314.

The exemplary embodiments are described below as model 330 with reference to a neural network. It should be noted, however, that other models may also be used, for example, models that include a matrix multiplication or a principal component analysis.

First sub-model 304 may be a first neural sub-network and may include a first encoder section 704 and a first decoder section 708. First encoder section 704 may be configured to process a down-scaled version of digital data of a first domain 740 and to output a code in a first latent space 706. First decoder section 708 may be configured to process the first code generated by first encoder section 704, present in first latent space 706 and to generate first sub-model data 306 based on the code. Second sub-model 314 may be a second neural network and may include a second encoder section 710 and a second decoder section 714. Second encoder section 710 may be configured to process data areas from digital data of a first domain 740 and to output a code in a second latent space 712. Second decoder section 714 may be configured to process the code present in second latent space 712, generated by second encoder section 710, and to generate second sub-model data 316 based on the code. Processor 108 may be configured to generate third output data 320 based on first sub-model data 306 and second sub-model data 316, as described in connection with processing system 300. Third output data 320 may be digital data of a second domain 750.

Second generator section 608 may include a third neural sub-network 720 and a fourth neural network 722. Third neural sub-network 720 may correspond essentially to the first neural sub-network, i.e., to first sub-model 304, a third encoder section 724 being able to be configured to process a down-scaled version of digital data of a second domain 750 and to output a code in a third latent space 726. Third decoder section 728 may be configured to process the code present in third latent space 726 generated by third encoder section 724 and to generate third sub-model data based on the code. Fourth neural sub-network 314 may correspond essentially to the second neural sub-network, i.e., to second sub-model 314, a fourth encoder section 730 being able to be configured to process data areas of digital data of a second domain 750 and to output a code in a fourth latent space 732. Fourth decoder section 734 may be configured to process the code present in fourth latent space 732, generated by fourth encoder section 730 and to generate fourth sub-model data based on the code. Processor 108 may be configured to generate digital data of a first domain 740 based on the third sub-model data and the fourth sub-model data.

Figure 8B:
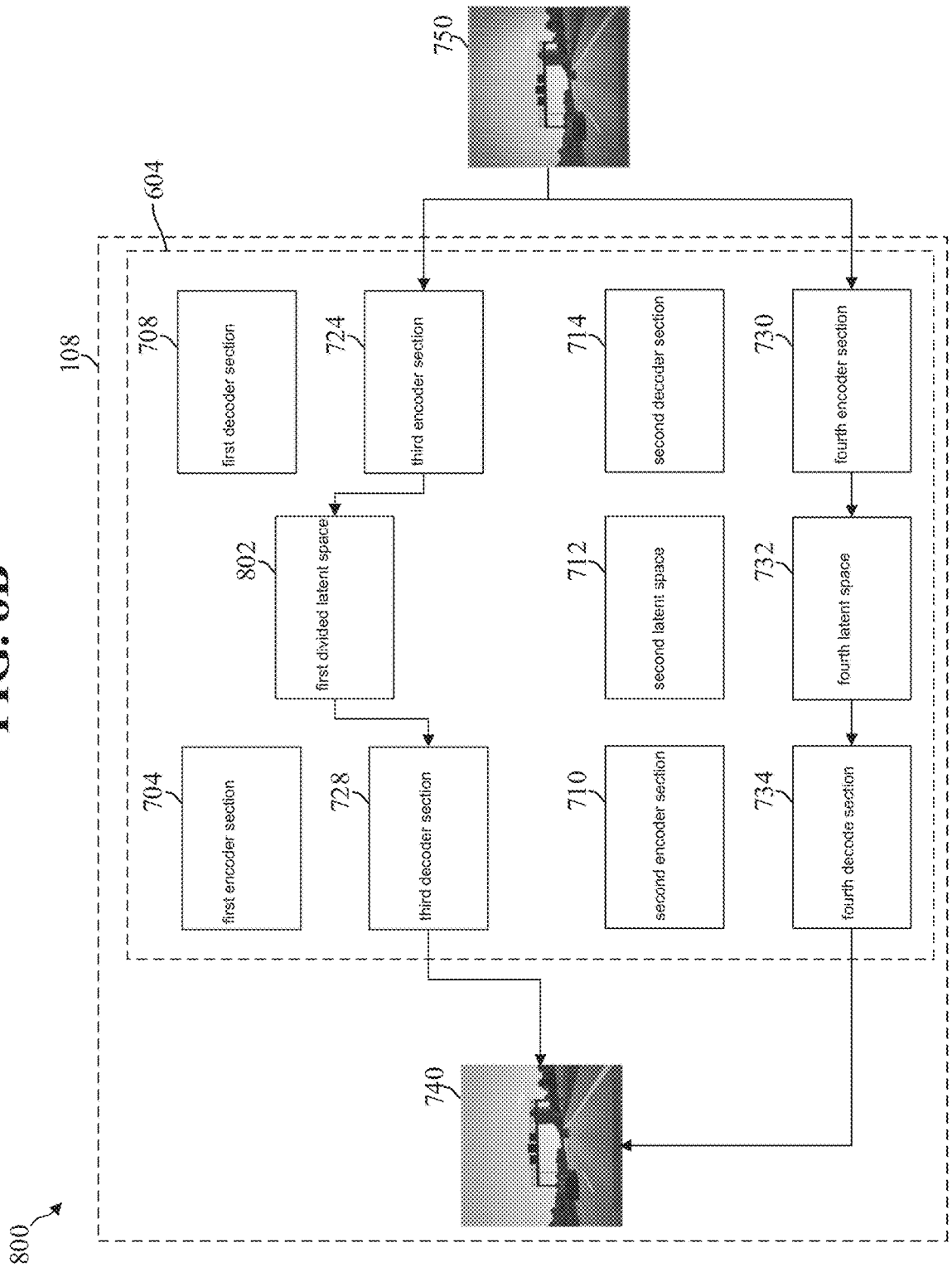

FIGS. 8A and 8B depict a generator section 800 of a GAN network according to different specific embodiments. Generator section 800 may correspond essentially to generator section 700, first encoder section 704 and third encoder section 724 mapping in a first divided latent space 802. In other words, first encoder section 704 and third encoder section 724 output a code in a first divided latent space 802. The processing of digital data of a first domain 740 depicted in FIG. 8A may correspond essentially to the processing of digital data of a first domain 740 depicted in FIG. 7 and described in this context, first encoder section 704 outputting a code in first divided latent space 802 and first decoder section 708 processing the code present in the first divided latent space. The processing of digital data of a second domain 750 depicted in FIG. 8B may correspond essentially to the processing of digital data of a second domain 750 depicted in FIG. 7 and described in this context, third encoder section 724 outputting a code in first divided latent space 802 and third decoder section 728 processing the code present in the first divided latent space.

Figure 9A:
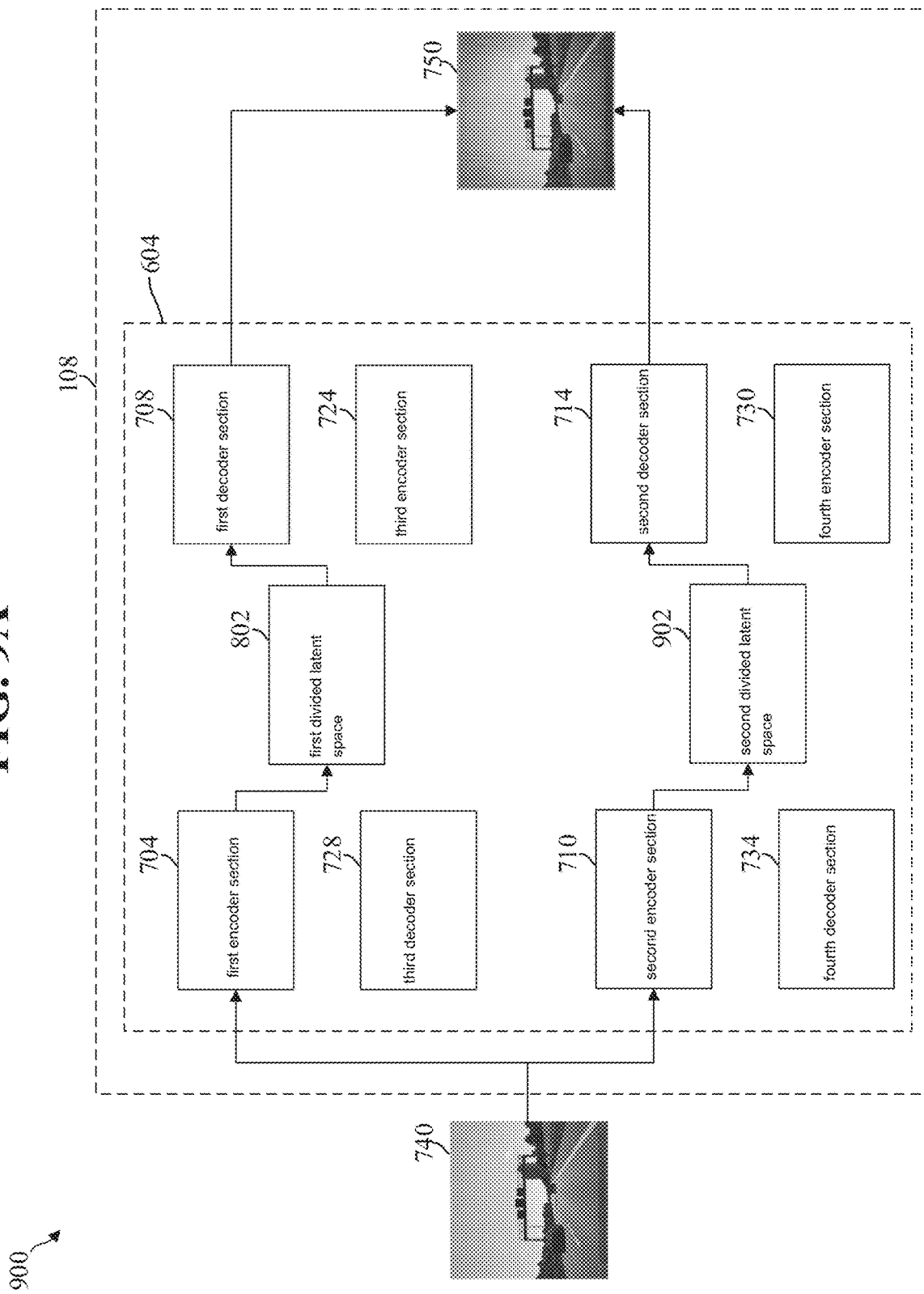
FIGS. 9A and 9B show a generator section of a GAN network according to different specific embodiments of the present invention.
Figure 9B:
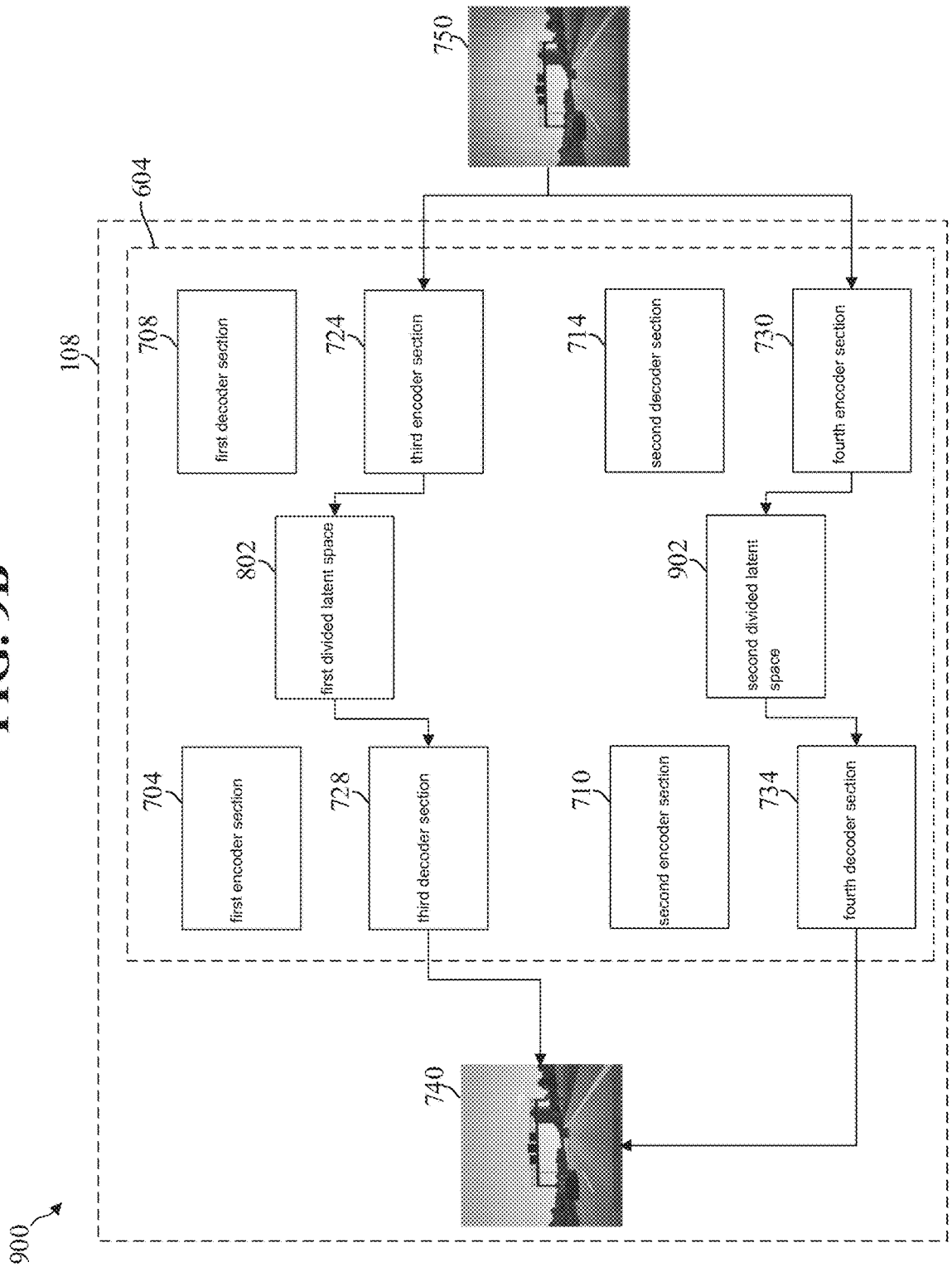

FIGS. 9A and 9B depict a generator section 900 of a GAN network according to different specific embodiments. Generator section 900 may correspond essentially to generator section 800, second encoder section 710 and fourth encoder section 730 mapping in a second divided latent space 902. In other words, second encoder section 710 and fourth encoder section 730 output a code in a second divided latent space 902. This means, first encoder section 704 and third encoder section 724 map in first divided latent space 802 and second encoder section 710 and fourth encoder section 730 map in second divided latent space 902. The processing of digital data of a first domain 740 depicted in FIG. 9A may correspond essentially to the processing of digital data in a first domain 740 depicted in FIG. 8A and described in this context, second encoder section 710 outputting a code in second divided latent space 902 and second decoder section 714 processing the code present in the second divided latent space. The processing of digital data of a second domain 750 depicted in FIG. 9B may correspond essentially to the processing of digital data of a second domain 750 depicted in FIG. 8B and described in this context, fourth encoder section 730 outputting a code in second divided latent space 902 and fourth decoder section 734 processing the code present in the second divided latent space.

Figure 10:
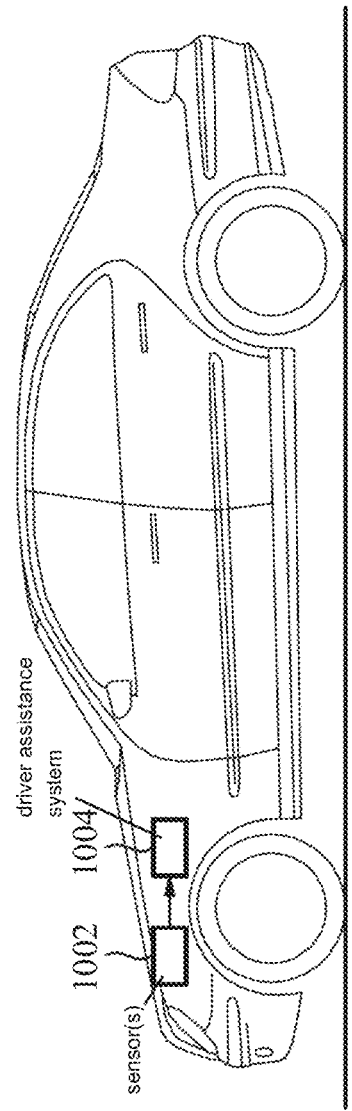
FIG. 10 shows a vehicle according to different specific embodiments of the present invention.

FIG. 10 depicts a vehicle 1000 according to one specific embodiment. Vehicle 1000 may be a vehicle including an internal combustion engine, an electric vehicle, a hybrid vehicle or a combination thereof. Vehicle 1000 may also be an automobile, a truck, a ship, a drone, an aircraft and the like. Vehicle 1000 may include at least one sensor 1002 such as, for example, an imaging sensor, a velocity sensor, an angle sensor, a temperature sensor or a sensor for detecting an accelerator position, an injection quantity or a rotational speed (for example, sensor 102). Vehicle 1000 may include a driving assistance system 1004. Driving assistance system 1004 may include memory device 106. Driving assistance system 1004 may include processor 108. Processor 108 may implement model 330, which is designed, for example, as a neural network. Driving assistance system 1004 may include a processing system 300, 400, 600, processing system 300, 400, 600 being able to process digital data 104 and processing system 300, 400, 600 being able to provide third output data 320.

According to different specific embodiments, model 330 according to method 500 has been trained to train a model in such a way that the trained model requires less memory for the internal calculations as part of the processing of digital data. This means that trained model 330 is further able to process digital data having a greater memory requirement such as, for example, a higher data quality or a larger image size. Thus, one aspect is to provide a vehicle that enables the processing of digital data having a greater memory requirement. Driving assistance system 1004 may be configured to control vehicle 1000 based on the processed digital data. In other words, driving assistance system 1004 may be configured to process digital data 104 and to be able to output at least one control command to one or to multiple actuators of vehicle 1000 based on third output data 320. This means, driving assistance system 1004 may influence the present driving behavior based on processed digital data, for example, the present driving behavior may be maintained or changed. The changing of the driving behavior may, for example, be an intervention in the driving behavior for safety reasons such as, for example, an emergency braking.

According to specific embodiments, the digital data include digital image data, which are provided by an imaging sensor such as, for example, a camera sensor or a video sensor. Driving assistance system 1004 may include a segmentation network. The segmentation network may be configured to process the digital image data output by processing system 300, 400, 600 based on the digital image data and to generate segmented image data. The digital image data may include at least one object and the segmented image data may include a segmentation of the at least one object. Driving assistance system 1004 may be configured to influence the present driving behavior based on the segmented image data. For example, an imaging sensor may provide an image having high resolution, which represents a pedestrian at night in front of vehicle 1000. Processing system 300, 400, 600 including model 330 may be configured to process the image having the high resolution, the segmentation network may segment the image generated by processing system 300, 400, 600, and driving assistance system 1004 may be configured to control the vehicle based on the segmented image.

According to different specific embodiments, model 330 may be implemented as generator section 700, 800, 900 of a GAN. The GAN may be configured to process the digital image data provided by the imaging sensor, the digital image data being associated with a first domain, for example, a road scene in sunshine. The GAN may further be configured to generate digital image data, which are associated with a second domain such as, for example, a road scene in rain. Driving assistance system 1004 may include an additional model. The additional model may be trained using the digital image data generated by the GAN. In other words, the additional model may be trained using the digital image data that are associated with the second domain. The trained additional model may be configured to output digital image data and driving assistance system 1004 may be configured to control the vehicle based on the digital image data output by the trained additional model.

What is claimed is:

1. A method for the computer-implemented training of a model, which includes a first sub-model and a second sub-model, the method comprising the following steps:
   downscaling digital data to generate first input data;
   dividing the digital data into multiple data areas to generate second input data;
   generating, by the first sub-model, first sub-model data relating to the first input data fed to the first sub-model;
   up-scaling the first sub-model data to form first output data;
   generating, by the second sub-model for the multiple data areas, corresponding output data areas relating to the second input data fed to the second sub-model;
   assembling the output data areas to form second output data;
   combining the first output data and the second output data to form third output data;
   training the first sub-model by comparing provided target data, which are assigned to the digital data, and the first output data; and
   training the second sub-model by comparing the target data and the third output data, wherein the model is a generative model, the digital data being associated with a first domain and the third output data being associated with a second domain, the method further comprising the following steps:
   generating training data via the trained model;
   training a second model using the generated training data;
   processing second digital data, which are associated with the second domain, via the second model in a driving assistance system; and
   determining a controlling command for an actuator of a vehicle based on the processed second digital data.

2. The method as recited in claim 1, wherein the first sub-model data generated by the first sub-model has the same resolution as the first input data.

3. The method as recited in claim 1, wherein the first sub-model includes a first auto-encoder.

4. The method as recited in claim 1, wherein the second sub-model generates the second sub-model data relating to the fed second input data, for each data area of the multiple data areas an associated output data area of the multiple output data areas being generated.

5. The method as recited in claim 1, wherein the second sub-model includes a second auto-encoder.

6. A training device configured to train a model, which includes a first sub-model and a second sub-model, the training device configured to:
   downscale digital data to generate first input data;
   divide the digital data into multiple data areas to generate second input data;
   generate, by the first sub-model, first sub-model data relating to the first input data fed to the first sub-model;
   up-scale the first sub-model data to form first output data;
   generate, by the second sub-model for the multiple data areas, corresponding output data areas relating to the second input data fed to the second sub-model;
   assemble the output data areas to form second output data;
   combine the first output data and the second output data to form third output data;
   train the first sub-model by comparing provided target data, which are assigned to the digital data, and the first output data; and
   train the second sub-model by comparing the target data and the third output data, wherein the model is a generative model, the digital data being associated with a first domain and the third output data being associated with a second domain, the training device being further configured to:
   generate training data via the trained model;
   train a second model using the generated training data;
   process second digital data, which are associated with the second domain, via the second model in a driving assistance system; and
   determine a controlling command for an actuator of a vehicle based on the processed second digital data.

* * * * *